United States Patent [19]
Kyalheim

[11] Patent Number: 5,222,290
[45] Date of Patent: Jun. 29, 1993

[54] APPARATUS FOR ATTACHING HINGES TO DOORS AND JAMBS

[75] Inventor: Andrew M. Kvalheim, Petaluma, Calif.

[73] Assignee: Kval, Inc., Petaluma, Calif.

[21] Appl. No.: 922,353

[22] Filed: Jul. 29, 1992

Related U.S. Application Data

[63] Continuation of Ser. No. 712,979, Jun. 10, 1991, abandoned.

[51] Int. Cl.$^5$ .............................................. B23P 21/00
[52] U.S. Cl. ...................................... 29/787; 29/771; 29/798; 29/809; 29/810; 269/905
[58] Field of Search ...................... 29/798, 238, 281.1, 29/431, 771, 809, 810, 813, 897.3, 434, 11; 269/905

[56] References Cited

U.S. PATENT DOCUMENTS

| | | |
|---|---|---|
| 2,943,764 | 7/1960 | Haberstump . |
| 3,071,291 | 1/1963 | David . |
| 3,339,601 | 9/1967 | Christman et al. . |
| 3,772,757 | 11/1973 | Goldstein ............................. 29/810 |
| 3,889,343 | 6/1975 | Miller et al. ......................... 29/809 |
| 3,979,817 | 9/1976 | Cheak . |
| 4,100,661 | 7/1978 | Cheak . |
| 4,782,588 | 11/1988 | Jangaard . |
| 4,785,531 | 11/1988 | Roy et al. . |
| 4,837,916 | 6/1989 | Jangaard . |
| 4,839,957 | 6/1989 | Jangaard . |
| 4,936,497 | 6/1990 | Ordelt ................................... 29/810 |

OTHER PUBLICATIONS

Model 990FA Routing/Boring Machine with Automatic Screwdriver of Kval, Inc., on sale over one year before the priority date of this application (photo).
Model 990F-2 Routing/Boring Machine with automatic Screwdriver of Kval, Inc., on sale over one year before the priority date of this application (brochure).
Kval Commander Door Machining Center of Kval, Inc., on sale over one year prior to the priority date of this application (Brochure).

*Primary Examiner*—P. W. Echols
*Assistant Examiner*—David P. Bryant
*Attorney, Agent, or Firm*—Corwin R. Horton

[57] ABSTRACT

A machine for attaching hinges to a door and jamb member in an automatic or semi-automatic manner with the door edge and jamb face positioned in a generally vertical plane. The machine comprises a framework with a movable and longitudinally positionable carriage on which the following elements are integrated.

1. An apparatus to hold a magazine of approximately 12 hinges (or butts) with fingers to move one hinge upward and position it on a receiving block, the fingers being retractable and movable downward to a ready position.
2. A second apparatus to hopper feed screws from above apparatus number 1, wherein the screws move downward into apertures through the receiving block positioned for alignment with screw holes in the hinge leaves of the hinge positioned on the opposite side of the block.
3. The third apparatus has means for rotating the loaded receiving block 90 degrees to a generally vertical plane, moving it against door edge and jamb face and engaging individual screwdriving motors to attach the hinge.

18 Claims, 16 Drawing Sheets

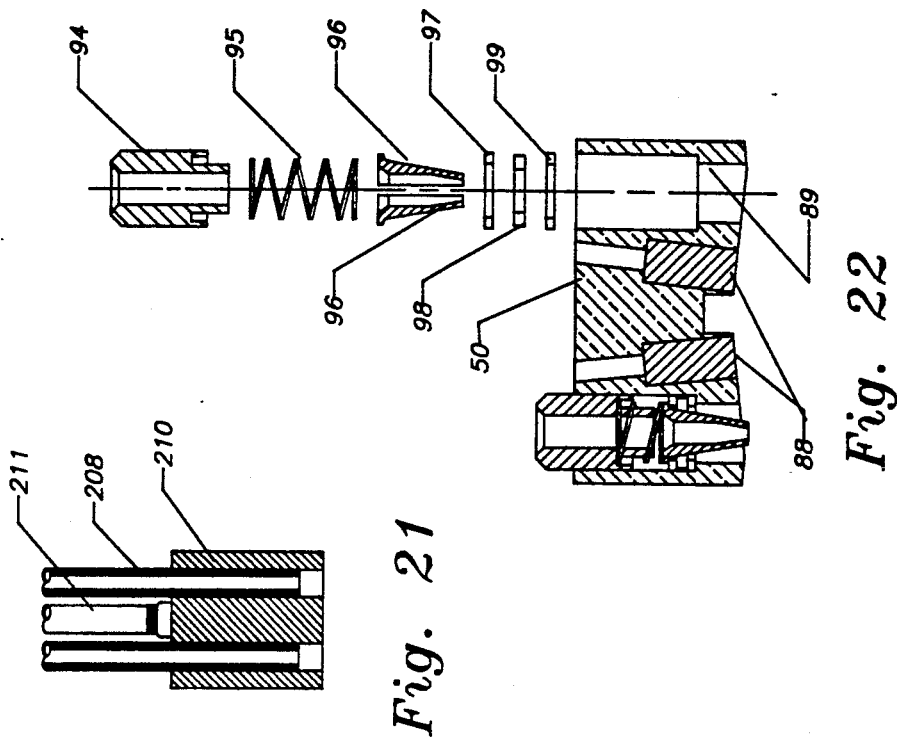
Fig. 22
Fig. 21
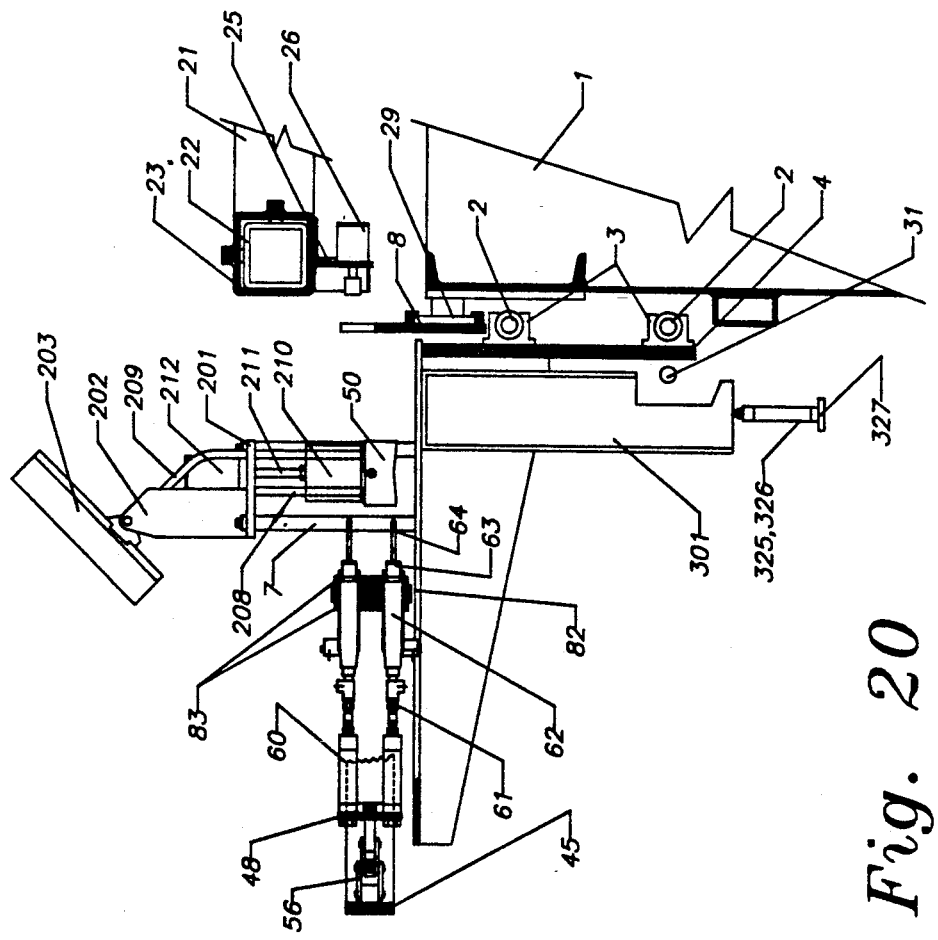
Fig. 20

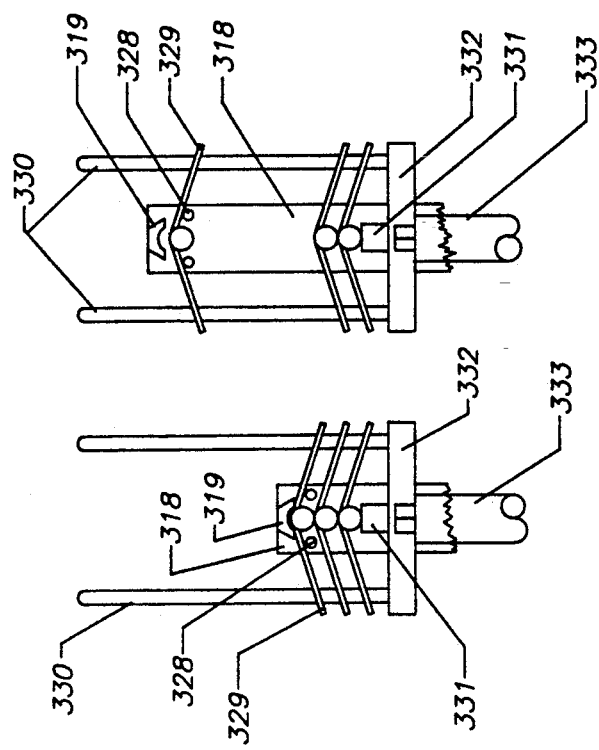
Fig. 34
Fig. 33
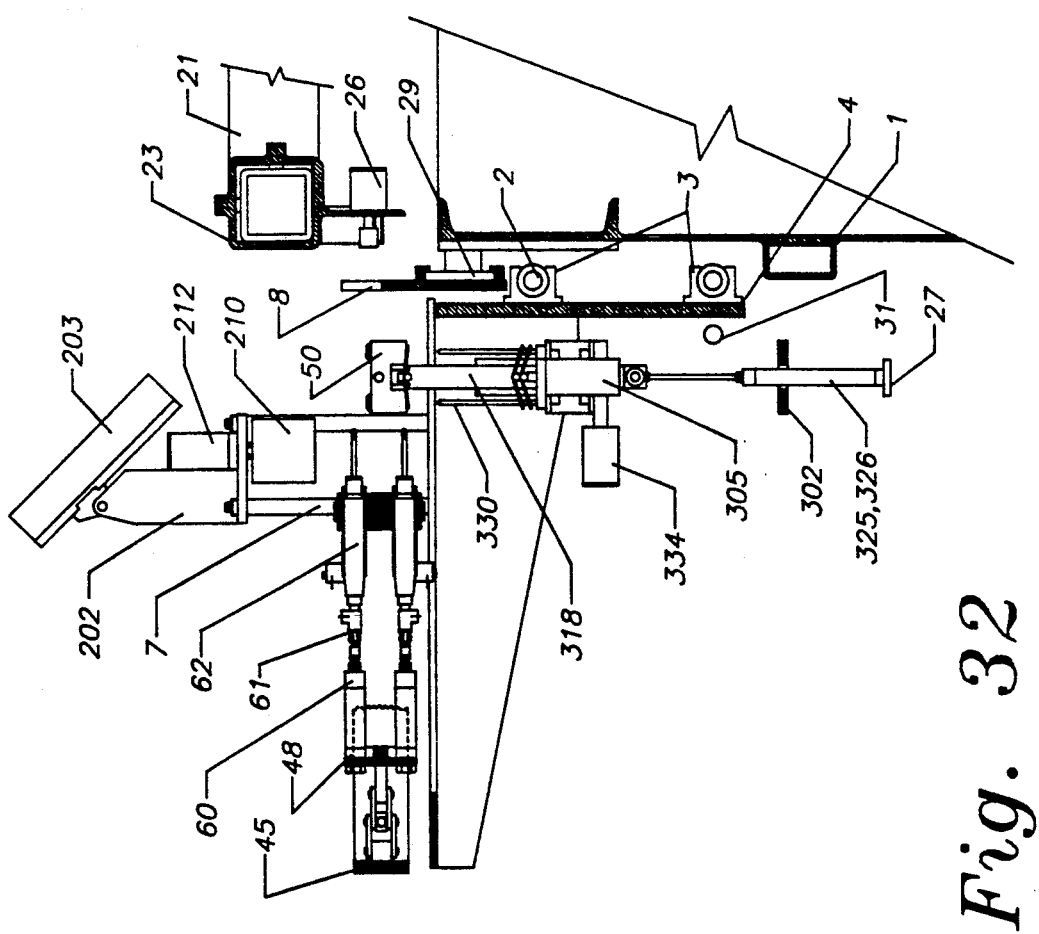
Fig. 32

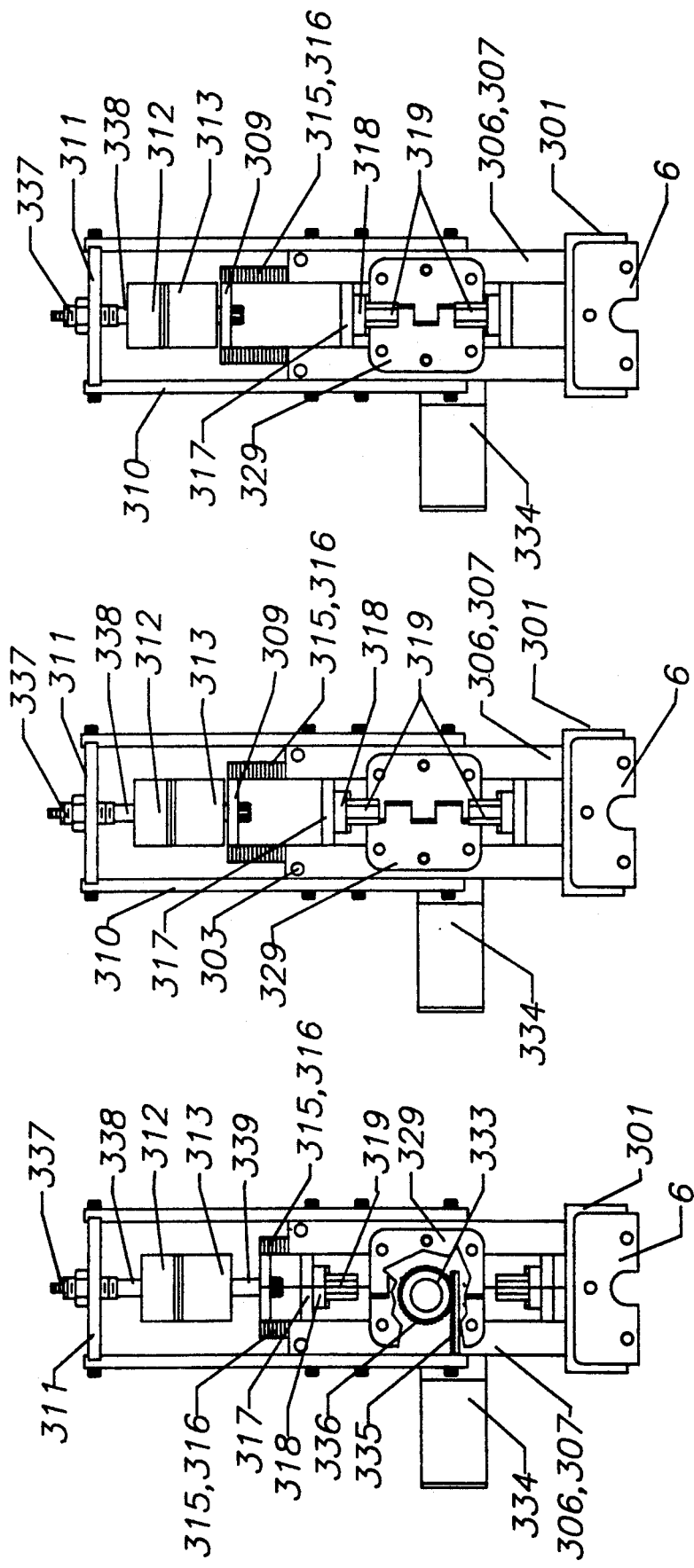

APPARATUS FOR ATTACHING HINGES TO DOORS AND JAMBS

This is a continuation of copending application Ser. No. 07/712,979 filed on Jun. 10, 1991, now abandoned.

FIELD OF THE INVENTION

This invention relates to automatically attaching hinges to the door edges and jamb face at predetermined locations in order to facilitate the production of pre-hung doors. More specifically the invention integrates the elements of automatic hinge feeding, automatic screw feeding, and automatic screwdriving and in addition integrates the function of automatically locating the hinges in correct position along the length of the door and jamb.

BACKGROUND OF THE INVENTION AND PRIOR ART

Originally carpenters hung doors at the work site but over the past few decades there have been various machines developed to facilitate the machining and assembly of pre-hung doors. This function is now performed generally by Millwork and Specialty firms. The process includes preparing the door, jamb, and other members by routing or mortising for hinges, drilling generally for a cylindrical type lock, attaching the hinges with screws, and nailing up the frame around the door. My invention relates specifically only to the special aspect of attaching the hinges. This has been a tedious and time consuming job if done manually. My invention claims a higher degree of automation than previously attained especially relating to hinge feeding with some notable improvements in other areas. Various considerations have been adopted relating to hinge application, the most notable and closely related known to the inventor is as follows:

U.S. Pat. No. 4,100,661 to Edward G. Cheak, provides for machining pre-hung door members, pre-drilling screw holes and attaching hinges without the use of automatic screw or hinge feeding.

U.S. Pat. No. 3,979,817 to Edward G. Cheak method claims of Cheak patent.

U.S. Pat. Nos. 4,837,916, 4,839,957, and 4,782,588 to Erlilng S. Jangaard describes a mechanism for automatic screw feeding, manual hinge feeding, and power means to drive screws.

U.S. Pat. No. 3,339,601 Carl E. Christman and Thomas S. Ferguson discloses an automatic work bench adapted for applying door knobs as well as hinges. The hinge attaching features are not separately claimed.

U.S. Pat. No. 4,785,531 to Armand E. Roy and Leo T. Roy demonstrates the application and placement of an easel type hinge in a specific manner.

U.S. Pat. No. 3,071,291 to Charles Alfred Davis applies to nailing machines for automatic feeding of nails rather than screws. It utilizes a separate oscillating hopper box to shake screws down a fixed slide assembly.

U.S. Pat. No. 2,943,764 to Alfred H. Haberstump uses an oscillating hopper box also with a fixed screw slide escapement assembly.

Although there are a number of patents relating to the general area of machine construction for the purpose of producing pre-hung doors, my invention has many novel features and none of these patents disclose nor claim an automatic hinge handling and positioning device such as found in my invention.

SUMMARY OF THE INVENTION

The object of my invention is to supply the pre-hung door industry with a machine to eliminate the tedious and repetitive job of handling screws and hinges and driving them in manually. Another object is to give the industry greater technology and labor saving mechanisms to increase productivity in a competitive environment.

Specifically my invention relates to the automatic application of butt hinges to door edges and jamb faces. This invention has several notable and novel features not found in other machines. After the pre-mortised door and jamb are clamped in place, a single, movable main carriage assembly locates automatically and accurately at repeatable intervals along the length of the door and jamb to attach hinges. After the main carriage is located in place, screws are inserted into a receiving block, now horizontally disposed, with spacement corresponding to the screw holes in butt hinges. This is accomplished in my invention by a system including a single screw hopper box designed with a slide escapement in the box itself rather than mounted in a separate fixed incline unit as commonly used.

Hinges are placed in register on the screw and hinge receiving block by an apparatus utilizing a magazine of approximately 12 hinges wherein fingers lift one hinge upward and place it on the receiving block where it is held in place by magnetic or other means. The fingers extend sideways to clear the hinge and drop down to a ready position for moving up the next hinge. The screwdriving system is mounted in a generally horizontal plane and movable toward and away from the door edge and jamb face. With the screwdriver bits retracted, the receiving block is rotated 90 degrees to a vertically disposed position, so that the hinge is in the same plane as the door edge and jamb face. Generally there are six screwdriver motors with direct drive bits. As a unit they move in close to the block to prevent screws from escaping the back side of the receiving blocks. The screwdriver carriage, with the screwdrivers in the same relative position to the block, moves in toward the door edge and jamb face and positions the hinge firmly in place in the mortised hinge pocket. Hook latches are engaged to secure the screwdriver carriage in the forward position. Screws are driven in by six individual cylinder actuated screwdriver motors to hold the hinge in place. If one screwdriver should malfunction, the remaining ones will drive in screws.

DESCRIPTION OF THE DRAWINGS

Further and more particular objects of the invention, as well as explicit details of structure will be apparent by reference to the following drawings, in which:

FIG. 20 is a side view of the main carriage showing a telescopic block engaged to the screw and hinge receiving block for automatic transfer of screws.

FIG. 21 is a sectional view of the telescopic block mentioned previously.

FIG. 22 is a sectional view of the screw and hinge receiving block with components.

FIG. 32 is a sectional view of the relationship of the screwdriving apparatus and the hinge placement apparatus in the hinge placement mode.

FIG. 33 is a view of the hinge magazine in the hinge pick up ready position.

FIG. 34 is a view of the hinge magazine with the top hinge separated from the rest of the hinges.

FIG. 39 is a top view of the apparatus for hinge feeding corresponding to the side view of FIG. 35. This view also shows the gear and rack system for rotating magazine 180 degrees.

FIG. 40 is a top view corresponding to the side view shown in FIG. 36.

FIG. 41 is a top view corresponding to the side view shown in FIG. 37.

DETAILED DESCRIPTION

Figure 1:
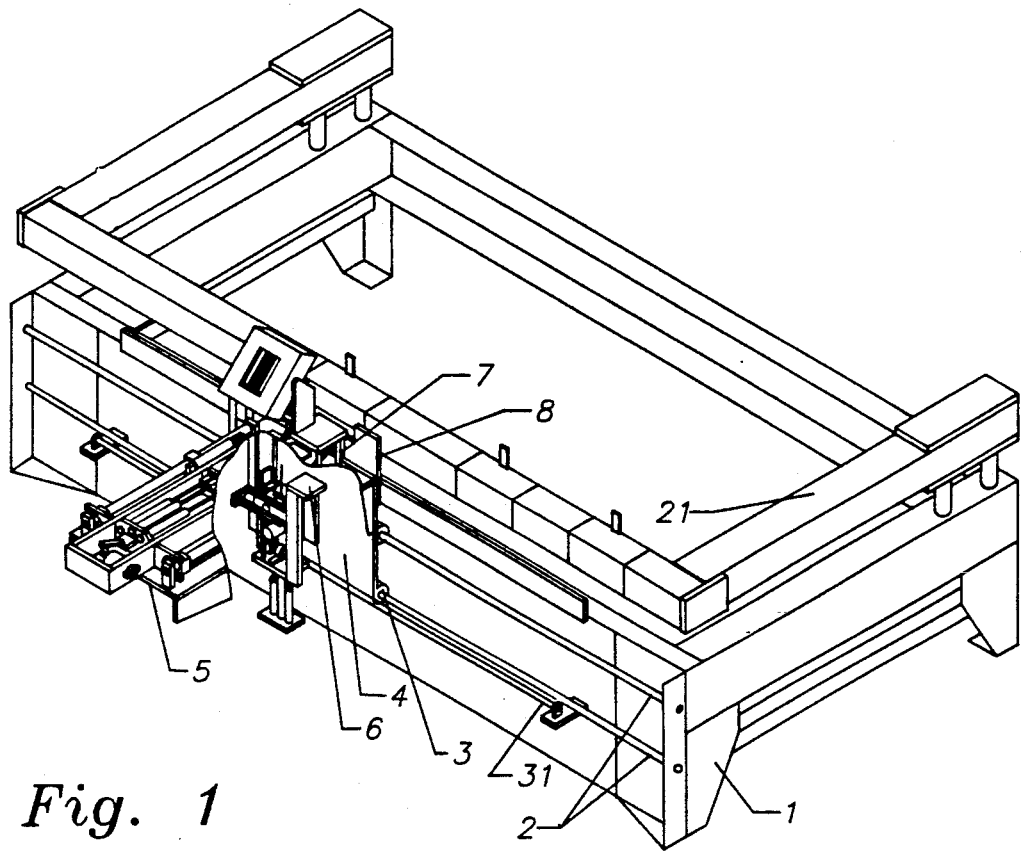
FIG. 1 is a perspective view of the machine frame structure showing a main carriage with the mechanisms of screwdriving, screw feeding, and hinge feeding.
Figure 2A:
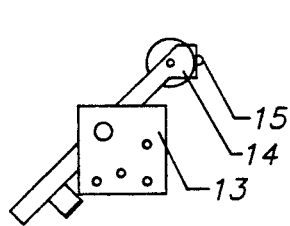
FIG. 2A is an enlarged view of a fragmentary portion of FIG. 2 showing a first door stopping device.
Figure 2B:
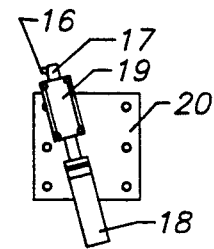
FIG. 2B is an enlarged view of a fragmentary portion of FIG. 2 showing a second door stopping device.
Figure 2:
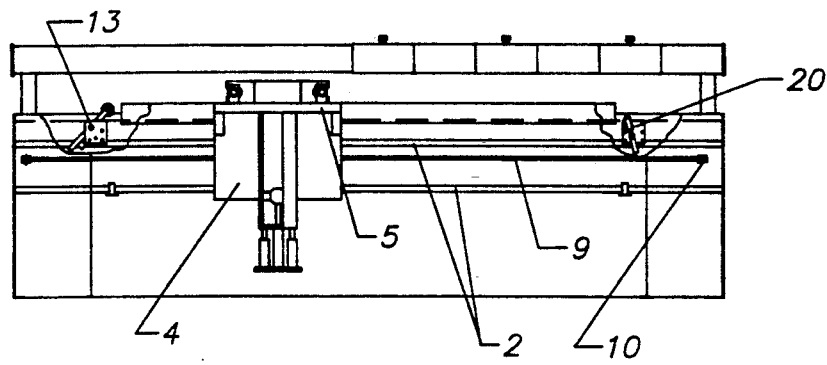
FIG. 2 is a front view of the frame structure of FIG. 1.
Figure 3:
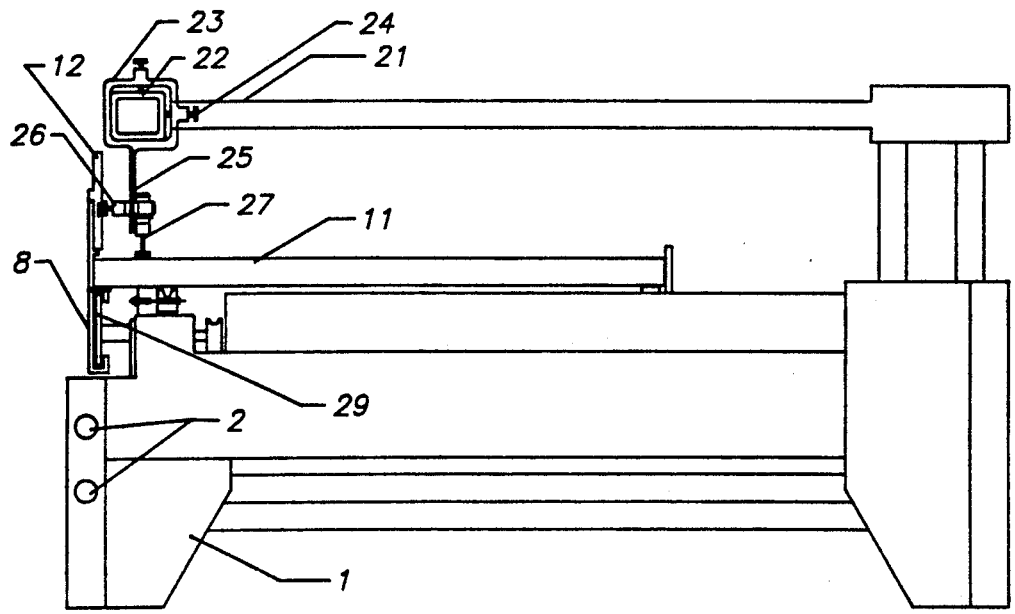
FIG. 3 is a side view of machine frame structure.
Figure 4:
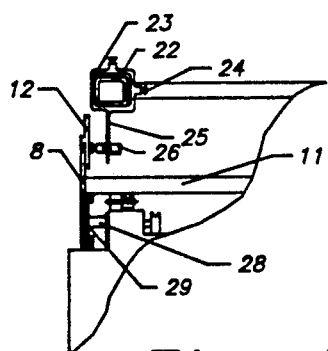
FIG. 4 is a partial side view jamb clamping system.
Figure 5:
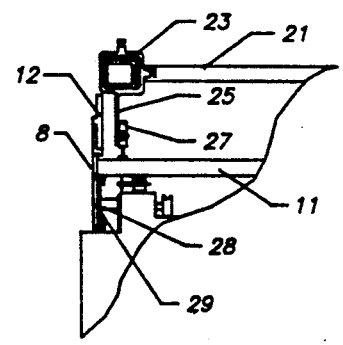
FIG. 5 is a partial side view of the door clamping system.
Figure 6:
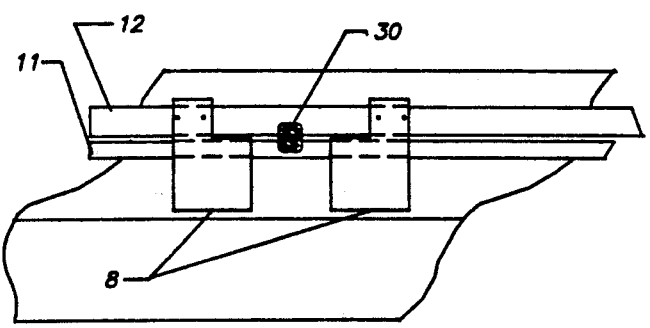
FIG. 6 is a partial front view of the frame structure supporting upstanding plates that retain the door and jamb showing also the position of hinge application.
Figure 7:
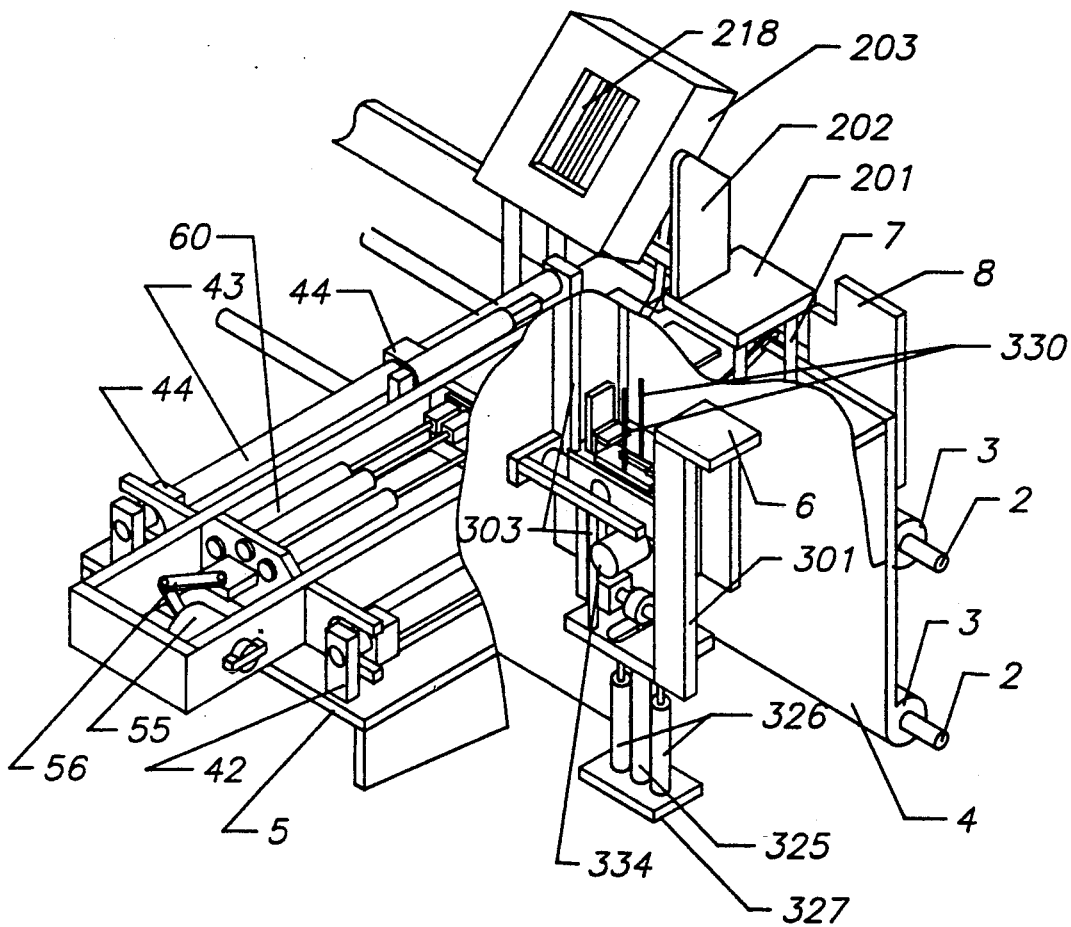
FIG. 7 is a perspective cutaway view of the main carriage with mechanisms of screwdriving, screw feeding, and hinge feeding.
Figure 9:
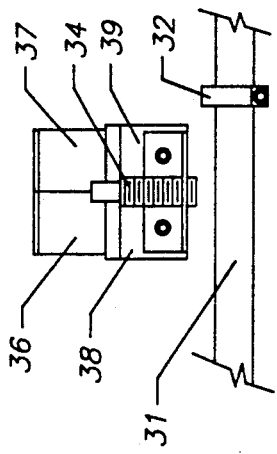
FIG. 9 is a breakout view of the stopping and sensing devices for the main carriage approaching a shaft stop collar.
Figure 10:
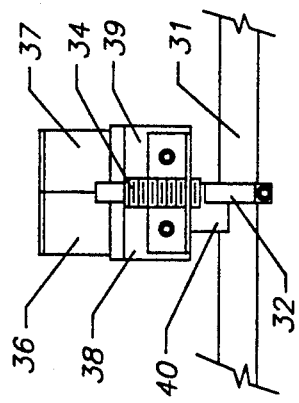
FIG. 10 is a breakout view of the stopping and sensing devices for the main carriage as the trailing stop member abuts the shaft collar.
Figure 11:
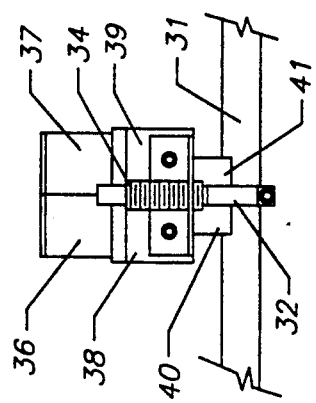
FIG. 11 is a breakout view of the carriage with the leading stop member locking the carriage.
Figure 8:
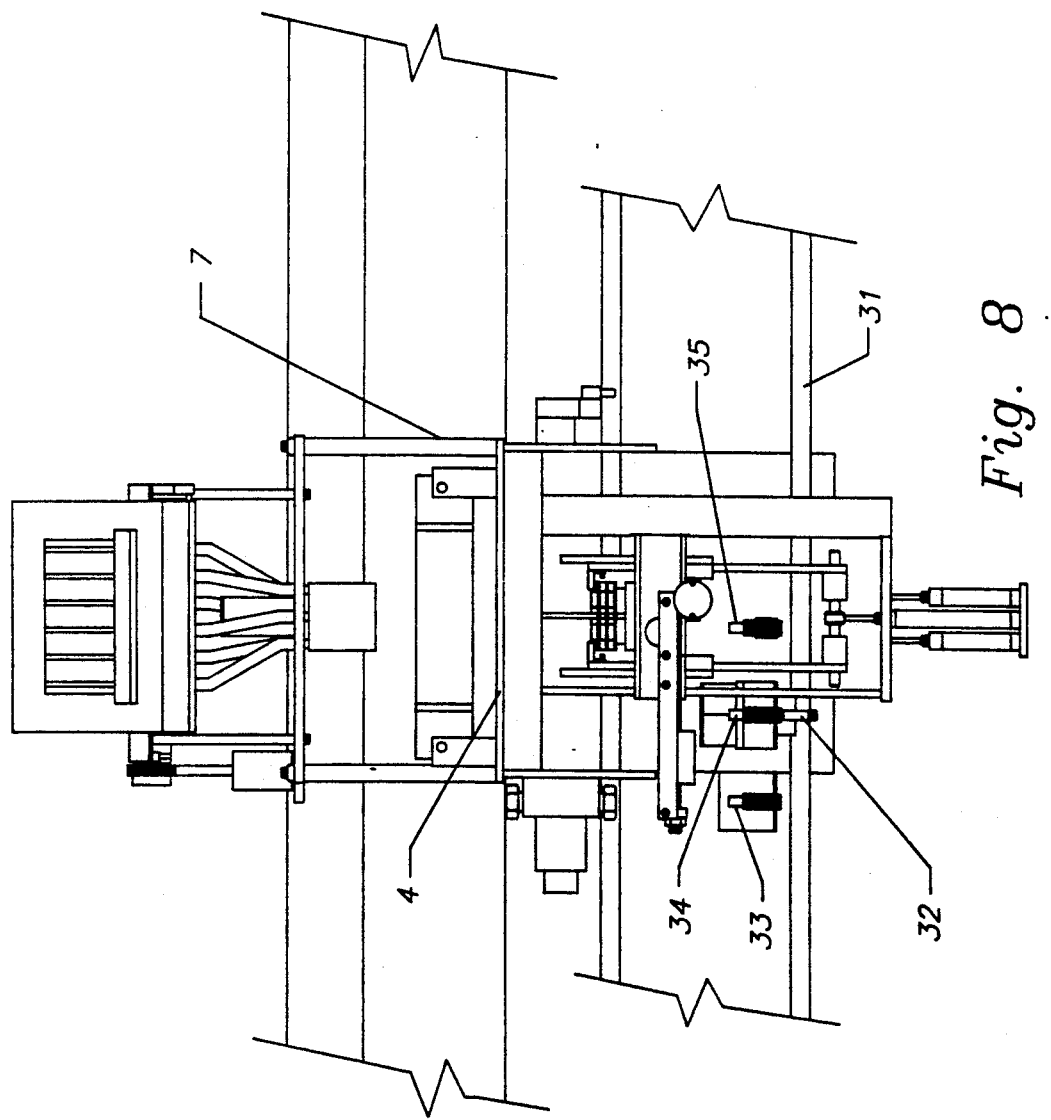
FIG. 8 is a front view of the main carriage showing transverse movement stopping and sensing devices.

Referring to FIGS. 1 through 7, a door 11 and jamb 12 are shown in position and supported on members of basic machine 1 with the door face being horizontally disposed leaving the front door edge in a generally vertical plane. The jamb 12 is positioned against upstanding members 8 with the jamb face being in the same general vertical plane as the door edge. Upstanding members 8 are adjustable horizontally along bar 29 supported by stantions 28. The door is normally slid on to the machine over pivotally mounted stop lever 14 pivoted from plate 13 which is attached to machine frame 1. After the door clears lever 14, it can be manually moved back against the vertical edge of stop lever 14, actuating switch 15. A jamb 12 can then be positioned against a corresponding end stop and held in place by cylinders 26 pressing the jamb against upstanding members 8. If the door is required to be machined in an opposite hand manner, the door can be moved forward against retractable and extendable stop 17 actuated through rectangular housing 19 by cylinder 18. This assembly is attached by plate 20 to machine frame 1 as shown. Either switch 15 or 16 will actuate door clamp cylinders 27. Clamps 27 are fastened to members 25, attached to slideable and rectangularly apertured members 23 over rectangular tube 22 which is attached and supported by upper frame structure 21 and said slideable members can be locked in place by turn screws 24. Two tracks or bearing ways 2 support plate 4 through lineal bearings 3 allowing for transverse motion. Continuous chain 9 is rigidly joined to plate 4 and said chain is diverted around sprockets 10 and driven by a gear motor on the back side of machine. Plate 5 which supports a screwdriver assembly, is fixedly fastened to plate 4 at 90 degrees in a horizontal plane. Stanchions 7 are attached to plate 5 and said stanchion support a screw feeding system. A hinge feeding system is supported by brackets 6 which are fixedly suspended from plate 5. The entire unit consisting substantially of these three elements attached to plate 4 will be designated as the main carriage.

Referring now to FIGS. 8 through 11. With the main carriage moving transversely from left to right, the electric sensors 33, 34, 35 mounted to plate 4 sense adjustable and pre-set collars 32 positioned on shaft 31.

In this direction, sensor 35 is activated by collar 32 thereby reducing speed of drive of chain 9 and extending stop 40 by cylinder 36 through aperture housing 38, this assembly being attached to plate 4. As collar 32 is abutted by stop 40, sensor 34 is activated extending stop 41 by cylinder 37 through aperture housing 39 thereby capturing collar from both side surfaces and locking main carriage in place. These preset locations determined by the collar settings coincide with the placement of hinges along the length of the door and jamb.

If opposite transverse main carriage motion is desired, that is right to left, then sensor 33 will replace sensor 35 in the circuit, thereby activating stop 41 first, then stop 40 to accommodate the correct function of the main carriage transverse locking system.

Figure 12:
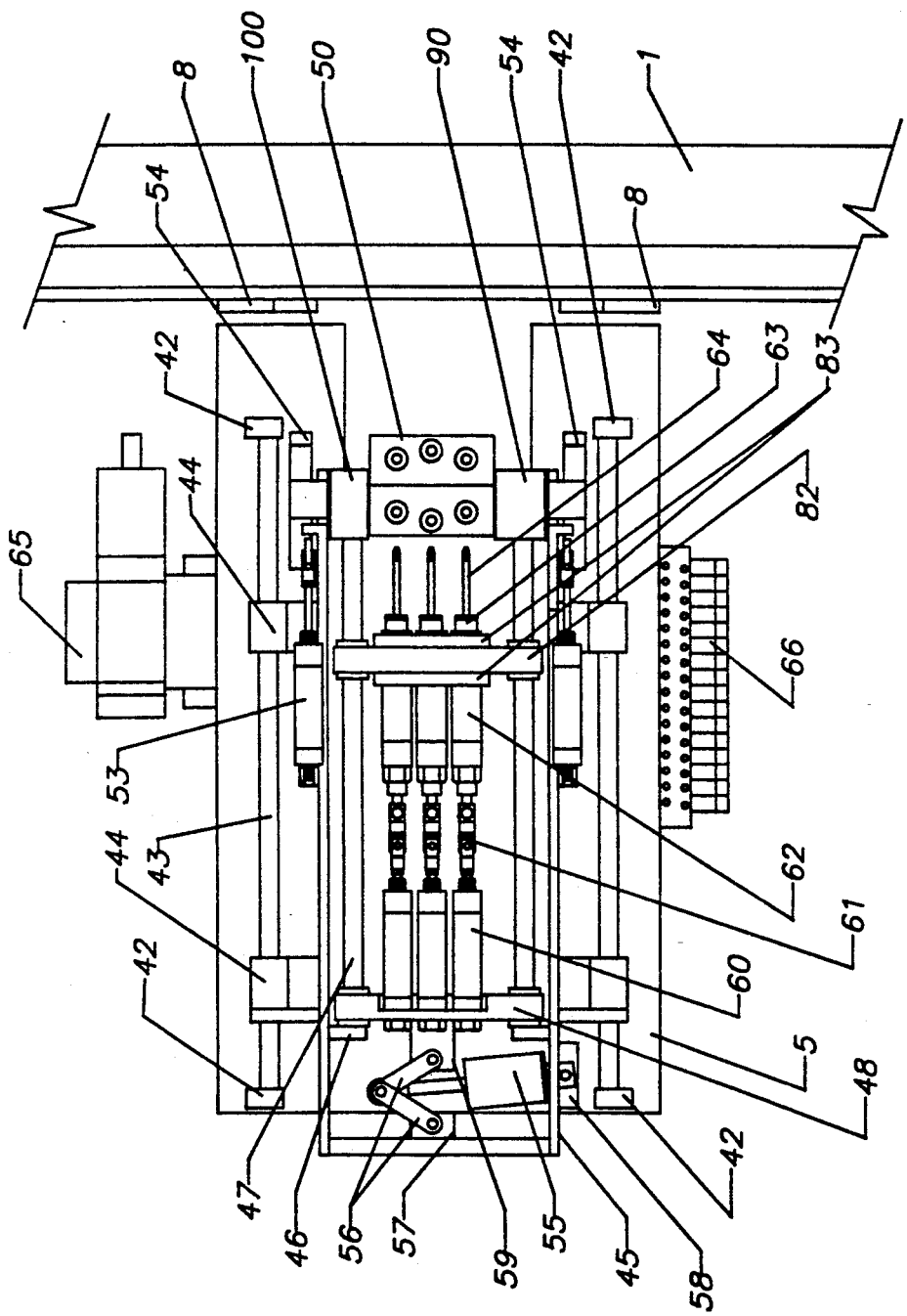
FIG. 12 is a top view of the screw driving apparatus with the screw and hinge receiving block in the horizontal position.
Figure 13:
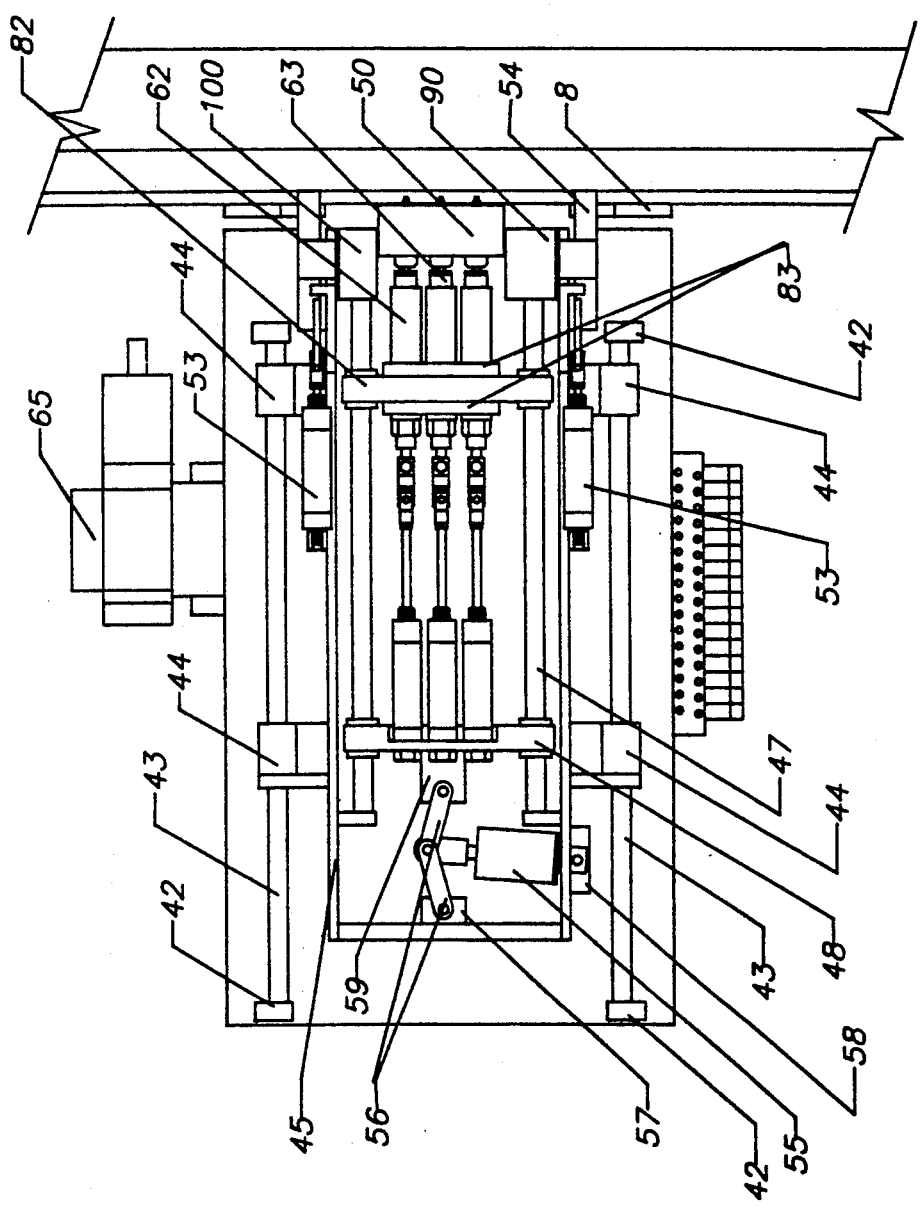
FIG. 13 is a top view of the screw driving apparatus with the screw and hinge receiving block in the vertical position.
Figure 14:
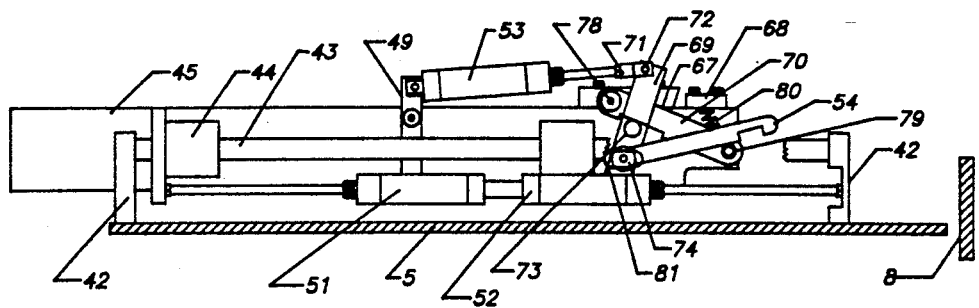
FIG. 14 is a side view of the latching mechanism of the second carriage with the latch disengaged.
Figure 15:
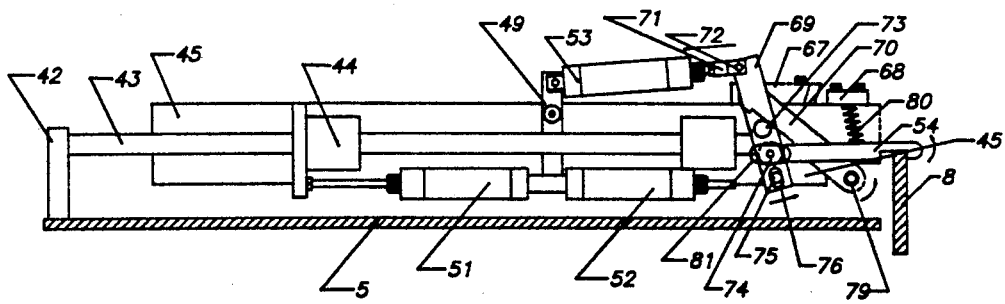
FIG. 15 is a side view of the latching mechanism of the second carriage engaged with the upstanding plate mounted to machine frame structure.
Figure 17:
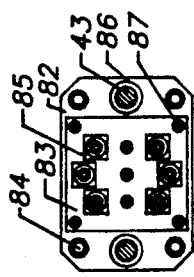
FIG. 17 is a front view (looking into ends of screw driver bits) of third carriage.

Now referring to FIGS. 12 through 22, a screwdriver system is mounted on plate 5 starting with stanchion blocks 42 supporting shaft ways 43 which in turn support carriage 45 through lineal bearings 44. Screwdriver carriage 45 is activated inwardly toward the jamb face and door edge, and outwardly by cylinders 51 and 52 shown in FIGS. 14 and 15. Carriage 45 is in the full outward position with these cylinders extended, full inward position with them retracted, and in an intermediate position with one extended and one retracted. These positions are used for convenient feeding or placement of hinges and screws and for applying the hinges to the work pieces. In the full inward position of carriage 45, the mechanisms of FIGS. 14 and 15 are utilized. Air cylinders 53 pivoted from brackets 49 actuate arms 54 over upstanding plates 8 and these arms impart by indirect lever action, both a downward holding motion and an inward tightening motion of carriage 45. The clevices 71 of cylinders 53 are connected to lever members 69 through pins 72. Members 69 are pivotally mounted and retained in elongated slots 76 by pins 75 secured in frame 45. Roller pins 73 in members 69 impart pivotal motion to members 70. Members 70 are pivoted from pins 78 attached to blocks 67 with the opposite ends of said members having roller pins interacting with arms 54. Arms 54 are both pivotally and slideably connected to frame 45 by pivotal blocks 74 fitted in slots 81 of frame 45. Arm 54 is held against pins 79 by compression springs 80 projecting from blocks 68.

Figure 18:
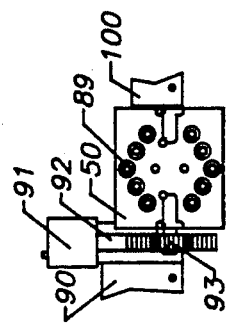
FIG. 18 is a front view of screw and hinge receiving block disposed vertically.
Figure 19:
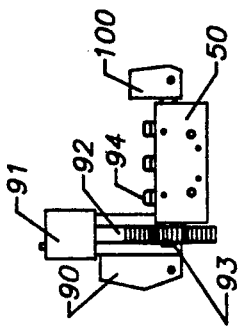
FIG. 19 is a front view of the screw and hinge receiving block positioned horizontally.
Figure 16:
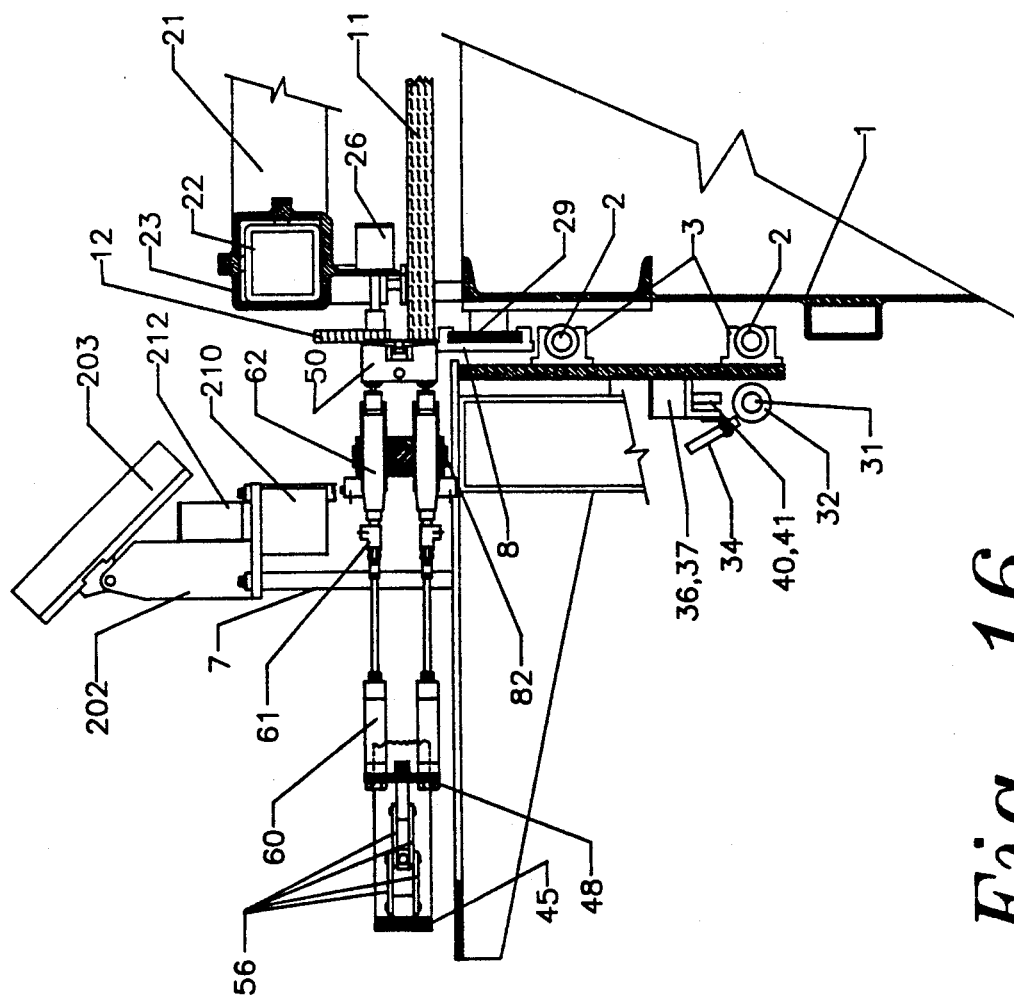
FIG. 16 is a sectional side view of the main carriage with hinge being applied to door edge and jamb face.

Referring to FIGS. 12 and 13, a screw and hinge receiving block 50 with contiguous parts are rotatably mounted between support blocks 90 and 100. Referring more specifically to FIGS. 18 and 19 and 22. Said receiving block 50 is rotateably activated by racks 92 and gear 93 through an arc of approximately 90 degrees by cylinder 91 secured to supporting member 90.

Receiving block 50, when horizontally disposed such as shown in FIGS. 19 and 22, is in a position to automatically receive the hinge butt on the underside held in place by magnets 88. In this orientation, also, screws can be inserted from the top through concentric sleeves 94.

Block 50, when in the vertically disposed plane, allows for manual hinge placement to block 50 as well as the fastening of the hinge in correct position with screws being driven in to hold hinge firmly to jamb surface 12 and door edge 11.

Referring to FIG. 22, block 50 houses generally 6 cylindrical indentations 89 or recesses coinciding with the screw holes in hinge butts. Steel rings or washers 99 and 97 with rubber flexible rings 98 are placed against hole shoulders. Then pairs of tapered, half circle shells or collets 96 are retained concentrically by said rings and with compression springs 95 and concentric sleeves 94 are retained from the top surface flanges of said shells. Magnets 88 are fixed in recesses to hold hinges to angular surface of block 50. Note that screws dropped through apertures in concentric sleeves 94 will lodge concentrically in shells 96. When rotating screw driver bits are inserted through sleeves 94, they will engage screw heads and drive screws into work pieces. The screws will exit block 50 by the action of the split shells pivoting open to allow the screw heads to pass through.

Referring to FIGS. 12, 13, 20, and 16, air cylinder 55 is attached to frame 45 by bracket 58 from which cylinder body is pivotally mounted. Rod of cylinder 55 is fitted with a pivot block, pivotally supporting pairs of scissor levers 56, one side of the pair being pinned rotatably from bracket 57 and the other side of the pair of lever members being pivotally mounted to bracket 59 attached to inner carriage member 48. Inner carriage member 48 is rigidly fastened by stud rods 84 with nuts to front screwdriver aperture holding plate 82. See FIG. 17. Plate 82 is abutted on both sides by bronze plates 83, attached by screws 87 having internal squarely apertured wearing surfaces, corresponding on centers, to the holes in the butt hinges being utilized. Lineal bearings 86 are bored into both plate 82 and 48 and ride in shafts 47 supported by brackets 46 attached to screwdriver frame 45. This bearing system allows movement of the inner carriage, as a unit, to be moved inward toward the work pieces and outward actuated by cylinder 55. In the fully extended position of scissor levers 56, the alignment is such that the extended lever arms can withstand a great force exerted by the six screwdriver cylinders 60. Cylinders 60 are secured to rear inner carriage plate 48 from the cylinder body ends. The alignment of cylinders 60, the individual screwdriver motors 62, the screwdriver bits 64, and the squarely apertured openings all coincide with the spacement of screw holes in the hinges with leaf flaps extended. T shaped fittings 61 are used to connect the piston rods of cylinders 60 with the concentrically threaded orifices of the air motors 62. The third position of the T fittings are used as the power air inlets coming from large value 65. Internal air circuitry of the air motors allows for initial reverse motion of screwdriver bits 64 held by screwdriver chucks 63.

In operation, this reverse feature helps seat the screws correctly before they are finally driven into place. The outer steel shells or housings 85 (FIG. 17) of the screwdriver motors 62 are square in cross section and are slideable in the square aperture of plates 82 and 83. The square construction of the screw motor housings 85, slideable within the square apertures of plates 82, 83, counteract the torque developed by the screwdriver bits.

The sequence of operation is generally governed by electrically operated air valves 66 (FIG. 12) controlled by programmable controllers and imputs such as limit switches and sensors. With the door 11 and jamb 12 clamped in place, and the main carriage locked in position as previously described and with collective elements including the screwdriver carriage frame 45, the inner carriage consisting in part of members 48, 82 and 84, and the screwdriver motors 62 all initially in the full outward position, then the following sequence can transpire: With screw and hinge receiving block 50 being horizontally disposed, the operator drops 6 screws through sleeves 94 so they lodge in split shells 96 (FIG. 22) of screw receiving block 50. Screw block 50 (FIGS.

12, 13, 17, 18) is rotated 90 degrees to a vertically disposed plane where the operator places hinge on face of block held in place by magnets. Cylinder 55 is then retracted moving inner carriage, consisting in part of items 48, 82, and 84, inward so that screwdriver bits 64 approach the back side of screw block 50 thereby restraining screws from retracting from the back side of block 50. Cylinders 53 (FIGS. 14, 15) moves latch arms 54 over plates 8 securing screwdriver carriage 45 so that vertically disposed screw block 50 with hinge 30 (FIG. 6) pressed against work pieces in pre-machined hinge pockets is firmly in place. After cylinders 60 are activated, with screwdriver motors 62 rotating in reverse, the screw locations are in effect predrilled to about $\frac{1}{8}''$ in depth by the reverse rotation of the screws. With this action being only momentary, the screwdriver rotation is changed to the normal mode and the screws are driven in place. The individually cylinder 60 activated screwdriver motors 62 allow each screw to be driven in completely since they each can be torqued to a certain preset stress. After the screws are driven in, the individual screwdriver motors 62, the inner carriage, consisting in part of members 48, 82, 84, and the outer screwdriver carriage 45 are all moved outward to the starting position. The main transverse carriage of plate 4 can then be automatically moved to the next hinge location and the cycle repeated.

Referring to FIGS. 20, 21, and 23 through 31B. In place of feeding screws by hand as described, this function can be done automatically by various commercially available screwfeeding devices or more adaptably by the screw feeding system hereinafter described.

Plate 201 is mounted on stanchions 7 with upstanding brackets 202 mounted vertically on plate 201. Screw hopper box 203 is pivotally mounted to brackets 202 through screw escapement block 204 attached to bottom plate 218 of box 203, through round shaft, 225 and journals 224.

Figure 25:
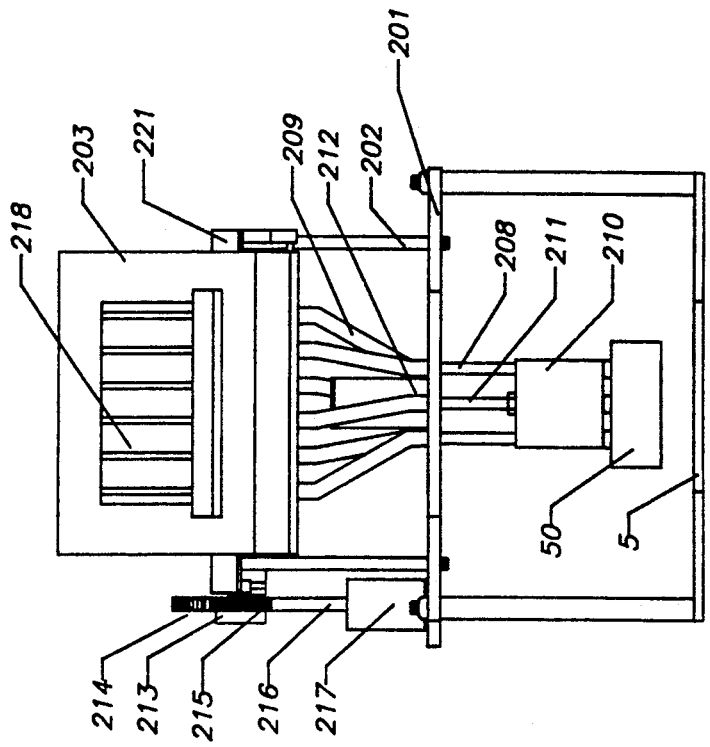
FIG. 25 is a face view of screw box container with screw transport tube, telescopic tube block extension, and screw and hinge receiving block.
Figure 24:
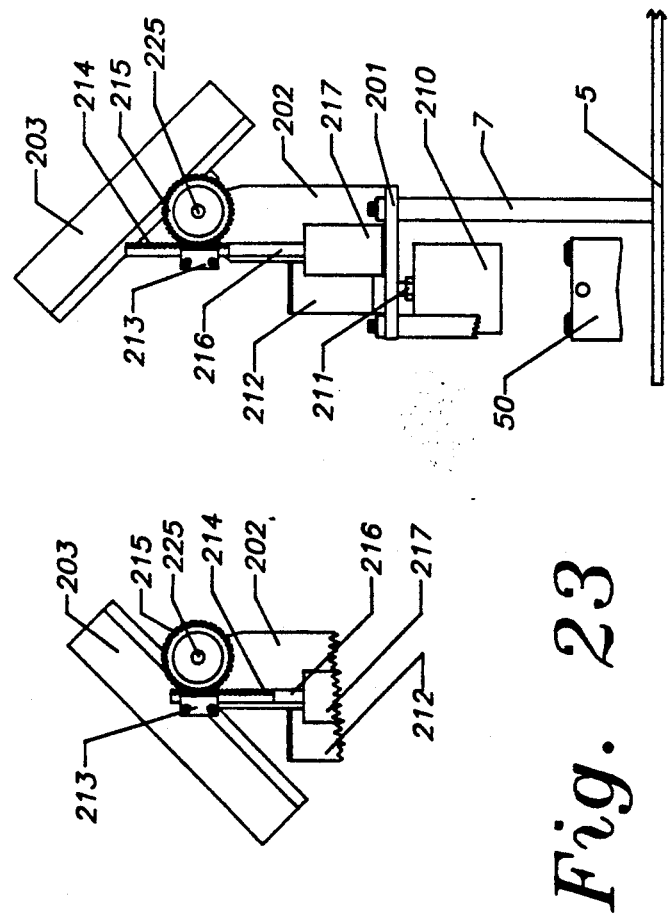
FIG. 24 is a side view of screw box container showing telescopic tube block extension and screw and hinge receiving block.
Figure 23:
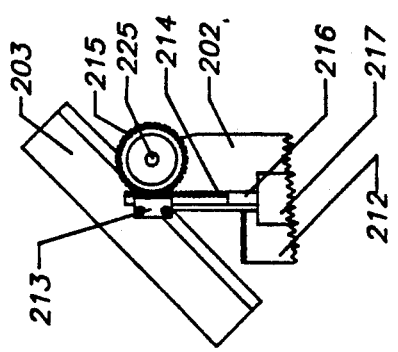
FIG. 23 is a partial side view of screw box container with gear and rack movement device.
Figure 26:
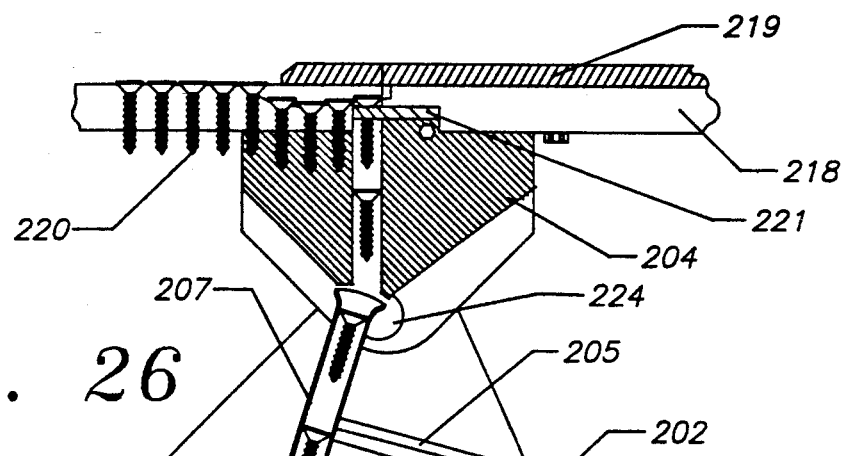
FIG. 26 is a sectional view of lower plate and pivot block of screw box container.
Figure 27:
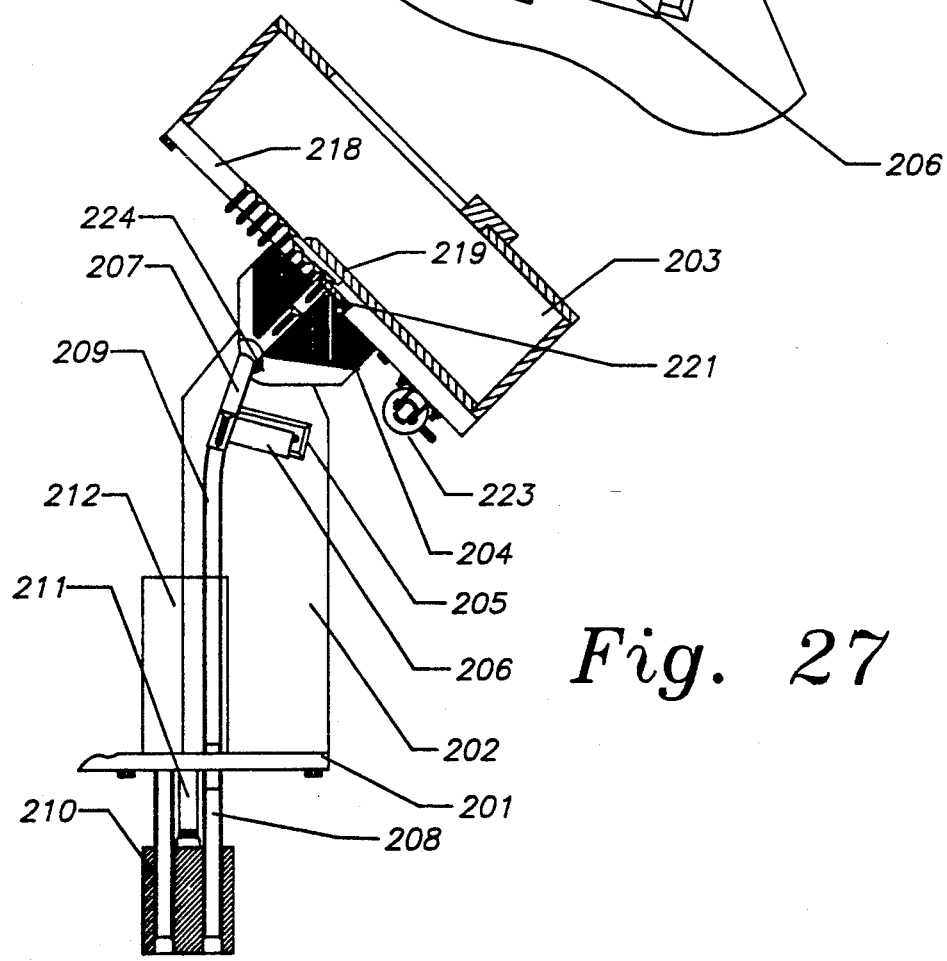
FIG. 27 is a sectional view of screw box container with escapement bar and screw path.
Figure 28:
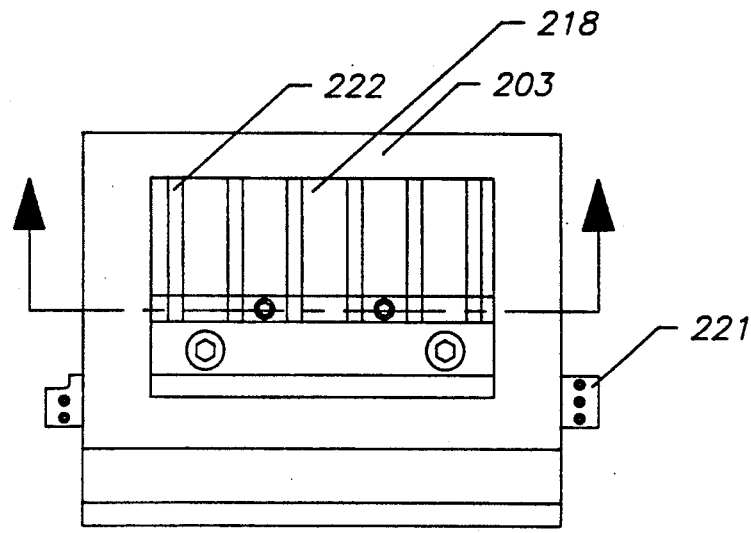
FIG. 28 is a top view of the screw box container.

Referring the FIG. 23, 24 and 25, box 203 is pivoted and actuated reciprocally by cylinder 217 attached rigidly to plate 201. Gear rack 214 is fastened to the end of cylinder rod 216 and said rack reciprocates through ways 213 with gear 215 meshing said rack. The rotary reciprocating movement of box 203 allows screws to slide from one end of box 203 to other and randomly fall into slots with screws oriented in a generally and collectively heads up position. Referring now to FIG. 26 through 31B, screws that have entered slots 222 slide down by gravity against escapement bar 221 actuated by cylinder 223 of FIGS. 27 allowing screws 220 to be picked off one at a time for each slot and dropped down through screw escapement block 204 into screw receivers 207 held in place fixedly by bar 206 engaged in block plates 205. Screws that have not entered slots 222 slide over plate 219 and are retained at the downward end of box 203 until the reverse tilting cycle is repeated. Flexible tube 209 is slid tightly over screw receiver 207 and over fixed straight tubes conduits 208 inserted and held in plate 201. Extendible block 210 acts as an extension for each of conduits 208 and is actuated vertically by cylinders 212 attached rigidly to plate 201 with cylinder rod 211 secured to extendible block 210. (See FIGS. 20, 21.) With the screw and hinge receiving block 50 in the horizontally disposed position, extendible block 210 moves down and mates block 50 so screws can be inserted into block 50 dropping into split shells 96 (FIG. 22.) Extendible block 210 is then retracted to allow the completion of the cycle.

Figures 29A, 30A, 31A:
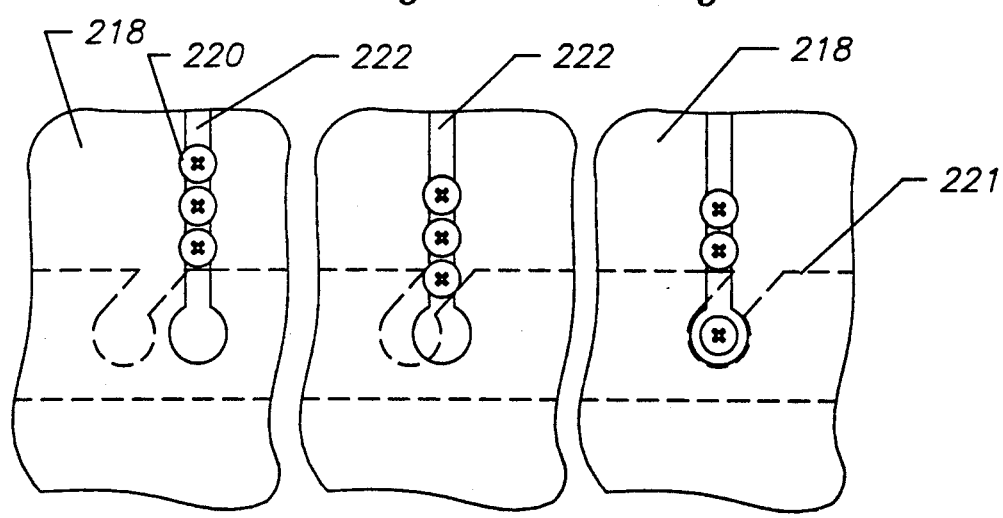
FIG. 29 A&B is the normal machine position of the screw escapement bar.
FIG. 30 A&B is the start position for dropping a screw into tube with the escapement bar.
FIG. 31 A&B is the drop position for one screw and hold back position of the remaining screws in a slot.
Figures 29B, 30B, 31B:
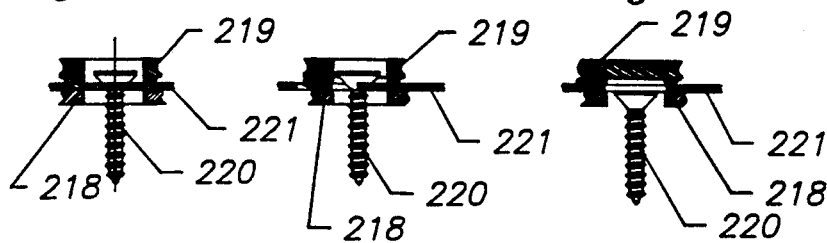

Referring to FIGS. 26 through 31B. The escapement bar is slideable within bottom plate 218 at 90 degrees to slots 222 in plate 218. These slots are recessed with shoulders so that the screws 220 drop down below plate 219 in advance of escapement bar 221. This allows the excess screws to pass over the escapement bar and come to rest at the lower end of box 203 when said box is in the down position. In FIGS. 29A and 29B, with the box in the down position, the screwfeeding sequence is in the "on hold" mode, and screws are retained in the box. FIGS. 30A and 30B show the escapement bar 221 moved so that the screw has started toward the "drop" location, while the point of the escapement bar is starting to come between the subject "drop" screw and the second screw behind it. FIGS. 31A and 31B show the screw in the full drop position with the point portion of the escapement bar obstructing the second screw from advancing. The box then pivots to the return position which moves the screws away from the escapement bar 221 allowing it to be shifted back to the starting position and also allowing the screws to return to the opposite end of the box so the process can be ongoing.

Figure 38:
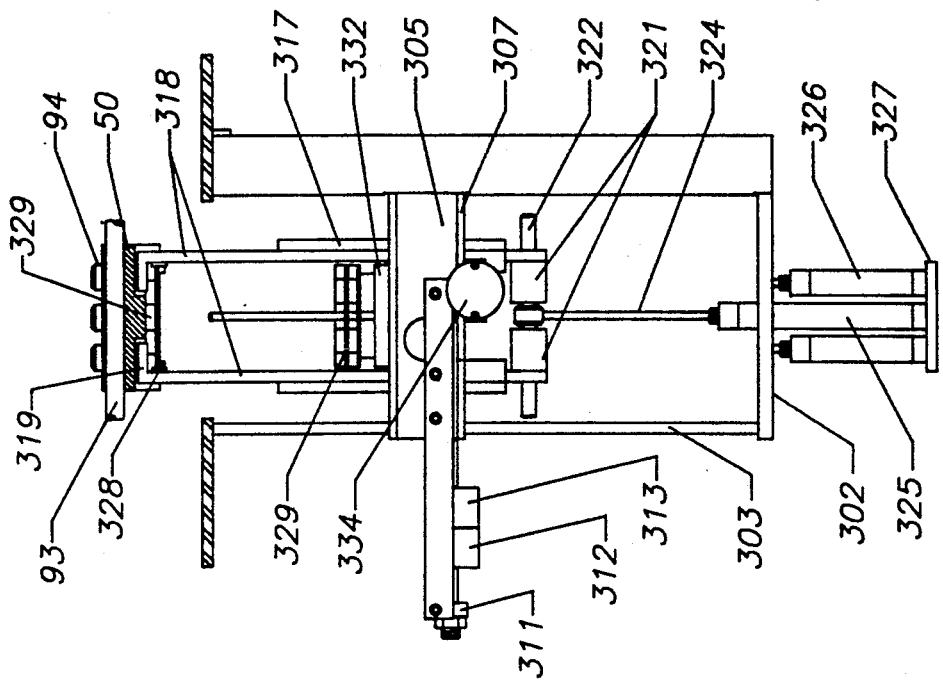
FIG. 38 is a side view of the apparatus for hinge feeding in the hinge placement mode.
Figure 37:
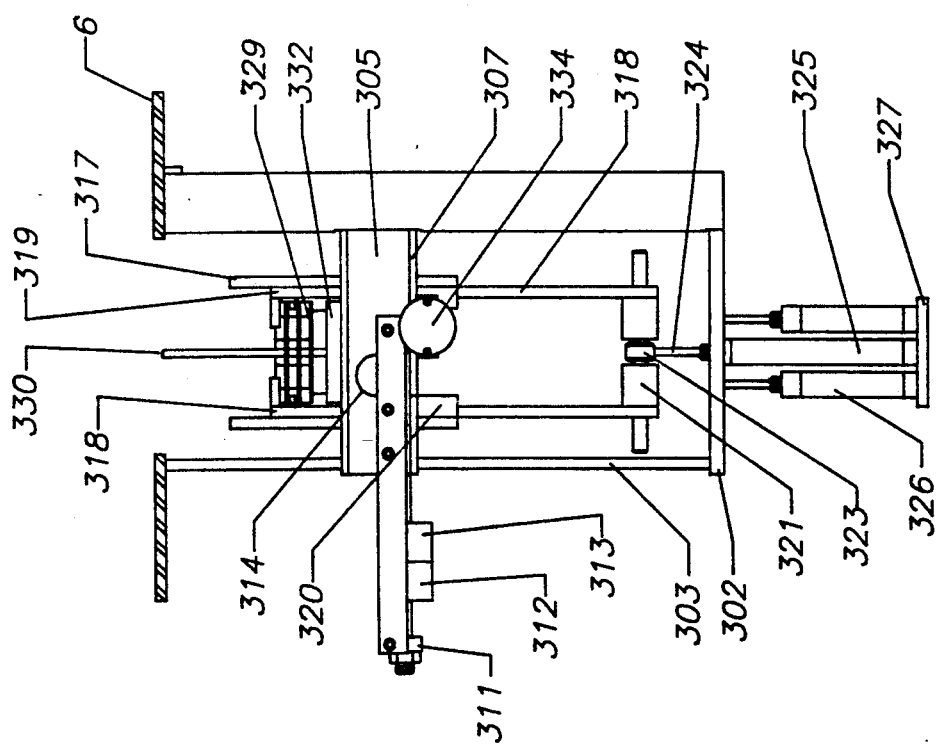
FIG. 37 is a side view of the apparatus for automatic hinge feeding in the hinge pick up mode.

Instead of placing hinges on the magnetic screw and hinge receiving block 50 manually, this function can be done automatically. Brackets 6, fixedly suspending the hinge feeding mechanism hereinafter described, are attached to the underside of plate 5 of the main carriage. The basic concept is to lift one hinge vertically and place it in register on magnetic hinge block 50 as shown in FIGS. 32 and 38.

Channel members 301 and round members 303 project downwardly from mounting brackets 6 and support horizontally disposed plate 302. Cylinder rods of air cylinders 326 are secured to plate 302 from the underside and said cylinders are rigidly attached to plate 327 on the cylinder ends. Cylinder 325 is also rigidly attached to plate 327 and said cylinder is extendable through an opening in plate 302.

Fixedly attached also to channel member 301 is an assembly housing various mechanisms with side plates 305 and top plates 306 and 307 shown. The top view of this assembly is characterized by a general H configuration (FIGS. 39 through 41) so that upstanding members 317 and 318 can project through said assembly and be movable transversely in and away from the center line of hinge 329.

Upstanding members 318 are vertically slideable through rectangularly apertured housings 320 with back supporting plates 317, said housings being restrained vertically within of the assembly but being slideable in and away from the centerline of hinge 329 placement.

Hardened round rod 322 is held by collar 323 attached to cylinder rod 324 of cylinder 325. Horizontally disposed lineal bearings are housed in blocks 321 which are fixedly attached to upstanding members 318. This construction allows both vertical and transverse movement of upstanding members 318.

The actuating means for transverse movement of housings 320 with back support plates 317 is a gear and rack system actuated by ganged air cylinders 312 and 313 attached one end to members 310 and 311 with adjusting means 337 and on the other end to rack 315. Top gear rack 316 (FIG. 36) attached to left side housing 320 with support back plate 317. Bottom rack 315 is fixedly attached to cylinder 313 rod end and said rack secured to the right side housing 320 and right support plate 317. Gear 314 mesh both racks 316 and 315 producing symmetrical and simultaneous movement of housings 320. In this installation identical pairs of racks are used with connecting bar 309 (FIG. 41) between racks. Cylinder bodies 312 and 313 are ganged in series so that it is possible to locate housings 320 (with supporting plates 317) in three transverse positions. i.e. full out position away from the centerline of the hinge, full in position toward the centerline of the hinge, and an intermediate or middle position. These positions are necessary for the hinge pick up function of the hinge feeding system. Hinges 329 are loaded in magazines outside the machine area and a magazine with plate 332 (FIGS. 33, 34) is placed over vertically disposed and rotatable shaft 333 with engaging means such as a hex protrusion to mate with magazine hopper plate 332. Spacer bar 331 is attached to plate 332 and two pins 330 extend vertically from plate 332. (See FIGS. 33 and 34). Hinges are loaded in magazine by dropping hinges down so that pins 330 extend through center screw holes of hinges. These hinges generally have pivot or knuckle pins with top and bottom ends. In loading the magazine, hinges are oriented always in the same direction. Means are provided for rotating the magazine 180 degrees for right hand or left hand application of hinges.

Figure 36:
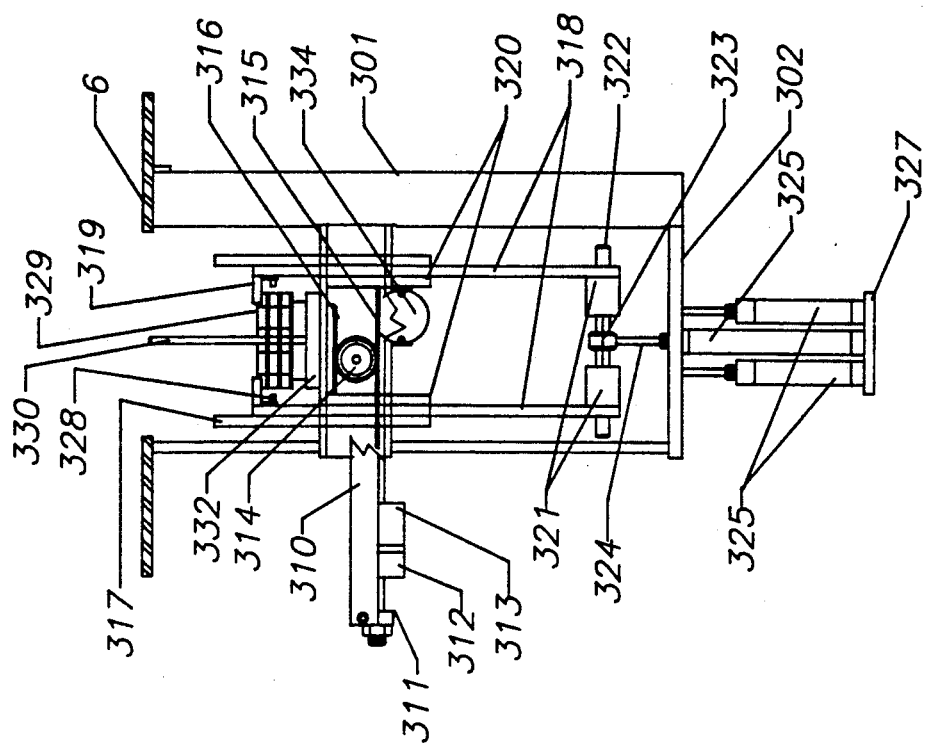
FIG. 36 is a side view of the apparatus for automatic hinge feeding with right angle brackets resting on the top hinge prior to the pick up mode. This view also shows a cutaway view of the gear and rack system for side movement of the bar arms.
Figure 35:
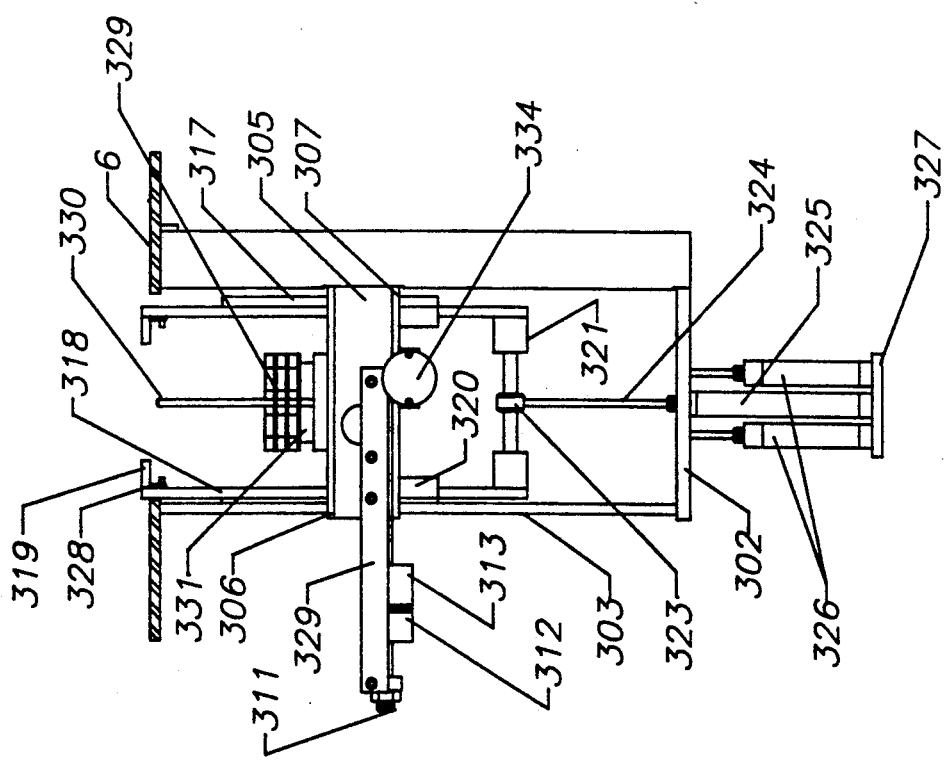
FIG. 35 is a side view of the apparatus for automatic hinge feeding with the mode set for rotating the magazine 180 degrees.

Referring to FIG. 39, rack 335 attached to end of cylinder rod of cylinder 334 actuates gear 336 which drives hex end shaft 333. Magazine consisting in part of plate 332 (FIGS. 33 and 34) mates hex end of 333 and as cylinder 334 is actuated from the full retracted mode to the fully extended mode, said magazine with hinges is rotated 180 degrees thereby orienting the hinge and knuckle pins correctly for right hand or left hand doors. This rotation is done only when plate members 318 are in transversely full out position and fingers 319 are in the intermediate up position, transpiring when cylinders 325, and 326 are fully extended. (FIGS. 35 and 36). Fingers 319 and pins 328 attached to 318 project inwardly toward the hinge. The sequence of movement follows:

1) The orientation of the hinge is accommodated as described above. Switches 15, 16 (FIG. 2) determine whether cylinder 334 is extended or retracted thereby orienting the hinge for left hand or right hand application.

2) Cylinder 312 remains extended and cylinder 313 retracts thereby placing fingers 319 in an intermediate position, allowing fingers to come down and register on top of hinge 329 without the pins 328 obstructing the downward movement. (See FIGS. 36 and 40.)

3) Both cylinder 312 and cylinder 313 are retracted thereby positioning pins 328 under leaves of the top hinge and this provides lifting means.

4) With hinge and screw receiving block 50 horizontally disposed and in correct location (determined by cylinders 51 and 52) and with upstanding bars 318 with fingers and pins as described in 3), hinge is moved upward and attached to magnetic block 50. (See FIGS. 38 and 41). Note that cylinders 226 are retracted and 225 is extended for maximum travel.

5) After the hinge is placed in the position shown in FIG. 38, cylinders 312 and 313 are extended thereby moving upstanding arms 318 outward and cylinders 326 move said arms downward to an intermediate vertical position. The cycle can then be repeated.

I claim:

1. Apparatus for hingedly connecting an adjacent pair of work members each having elongate hinge leaf receiving surfaces, by butt hinges to be seated on said receiving surfaces comprising:
    (a) means for supporting said work members so that said receiving surfaces are in position for receiving the leaves of said butt hinge,
    (b) a hinge applicator mounted for movement between a hinge applying location adjacent to said hinge leaf receiving surfaces when said work members are in position for receiving hinges and a hinge receiving location and having means for moving said applicator therebetween, said applicator having
        i. a screw receiving side and a hinge applying side with a plurality of apertures extending therebetween, said apertures being adapted for receiving screws at said screw receiving side and for guiding screws therethrough as they are screwed into said hinge leaf receiving surfaces and
        ii. hinge supporting means associated with said hinge applying side for releasably supporting a hinge positioned with the screw holes of each leaf in alignment with said apertures until the hinge leaves are screwed to said butt-receiving surfaces,
    (c) means for supplying screws individually to said apertures of said hinge applicator,
    (d) means for sequentially supplying to and placing individual hinges on said hinge applying side of said hinge applicator with their leaves unfolded and with the screw holes in register with said apertures, said hinge supplying and placing means being in supplying and placing communication with said hinge applying side when said applicator is in the hinge receiving location and
    (e) a screwdriver unit comprising screwdrivers mounted for movement between a retracted position with the screwdrivers retracted from said hinge applicator and an engaged position with said screwdrivers engaged in said apertures of the hinge applicator for driving screws therethrough into said hinge leaf receiving surfaces when said hinge applicator is at the hinge applying location and having means for moving said unit therebetween.

2. An apparatus as in claim 1 and wherein said hinge supplying and placing means comprises a magazine adapted to hold a stack of unfolded butt hinges in parallel relationship and moving means associated therewith for sequentially moving individual hinges from said stack to said hinge applying side of said hinge applicator.

3. An apparatus as in claim 2 and wherein said magazine includes one or more pins positioned to project through vertically aligned screw holes in the leaves of the stacked hinges to thereby retain the hinges in stacked relationship.

4. An apparatus as in claim 2 and wherein said magazine is positioned so that the unfolded hinges in said stack confront the hinge applying side of said hinge applicator when said hinge applicator is at the hinge receiving location.

5. An apparatus as in claim 2 and wherein said magazine is rotatable 180 degrees about its vertical axis from a first position, with the hinge pins in said hinge stack at a first orientation, to a second orientation, with the hinge pins in the opposite direction, to permit application of hinges in either left hand or right hand orientation.

6. An apparatus as in claim 2 and wherein said hinge applicator is rotatable between a charging position with said screw receiving side and said hinge applying side each in a substantially horizontal plane, for receiving screws and a hinge, respectively, at said position for receiving hinges, and a hinge applying position with said hinge applying side confronting said hinge leaf receiving surfaces, for applying the hinge to said hinge leaf receiving surfaces when said hinge applicator is at the hinge applying location.

7. An apparatus as in claim 2 and wherein said magazine is positioned below the location of the hinge applying side of said hinge applicator when at the hinge applying location and is adapted to maintain said stack of hinges vertically and said moving means includes means for sequentially grasping the uppermost hinge of the stack for movement upward to said hinge applying side of said hinge applicator.

8. An apparatus as in claim 7 and wherein said grasping means comprises cooperating grasping members at each of two opposed vertical sides of said magazine, the grasping members at each side being movable between a disengaged position horizontally spaced from the stack of hinges to an inward position in grasping engagement with their respective side of a hinge in the stack.

9. An apparatus as in claim 8 and wherein said grasping members include lower grasping members positioned to underlie and support each leaf of the hinge when said grasping means is in the inward position and an upper member positioned to overlie the hinge pin of the hinge when said grasping means is in the inward position.

10. An apparatus as in claim 9 and wherein said moving means includes a carrier arm at each of said two opposed vertical sides of said magazine supporting the grasping members at the respective side, said carrier arms being operable to simultaneously move their respective grasping members from their disengaged positions to their inward positions to grasp a hinge in the stack, to simultaneously move their respective grasping members upward to said hinge applying side of said hinge applicator to apply the hinge to said applying side of said hinge applicator and to then move said grasping members to the disengaged position and return said grasping members to a position adjacent the next hinge in said stack for grasping and moving the next hinge.

11. Apparatus for hingedly connecting an adjacent pair of work members each having elongate hinge leaf receiving surfaces, by butt hinges to be seated on said receiving surfaces comprising:
(a) means for supporting said work members so that said receiving surfaces are in position for receiving the leaves of said butt hinge,
(b) a hinge applicator
  i. being mounted for movement between a hinge applying location adjacent to said hinge leaf receiving surfaces when said work members are in position for receiving hinges and a screw and hinge receiving location and having means for moving said applicator therebetween,
  ii. having a screw receiving side and an opposed hinge applying side with a plurality of apertures extending therebetween, said apertures being adapted for receiving screws at said screw receiving side and for guiding screws therethrough as they are screwed into said hinge leaf receiving surfaces,
  iii. being rotatable between a charging position with said screw receiving side and said hinge applying side each in a substantially horizontal plane for receiving screws and a hinge, respectively, and a hinge applying position with said hinge applying side confronting said hinge leaf receiving surfaces, for applying the hinge to said hinge leaf receiving surfaces, and having means for moving said applicator therebetween, and
  iv. having hinge supporting means associated with said hinge applying side for releasably supporting a hinge positioned with the screw holes of each leaf in alignment with said apertures until the hinge leaves are screwed to said butt-receiving surfaces.
(c) means for supplying screws individually to said apertures, said screw supplying means being in supply communication with said apertures when said applicator is in said charging position at said screw and hinge receiving location,
(d) means for supplying hinges individually to said hinge applying side of said hinge applicator, said hinge supplying means being in supply communication with said hinge applying side when said hinge applicator is in the charging position at said screw and hinge receiving location and
(e) a screwdriver unit comprising screwdrivers mounted for movement between a retracted position with the screwdrivers retracted from said hinge applicator and an engaged position with said screwdrivers engaged in said apertures of the hinge applicator for driving screws therethrough into said hinge leaf receiving surfaces when said hinge applicator is at the hinge applying location and having means for moving said unit therebetween.

12. Apparatus as in claim 11 and wherein said apertures each have a collet therein adapted to hold the screw and to guide the screw therethrough during driving of the screw into the hinge leaf receiving surfaces.

13. Apparatus as in claim 11 and wherein said means for supplying screws to said apertures includes a plurality of screw delivery conduits, each sequentially delivering a single screw to an aperture of said hinge applicator, each of said conduits including a conduit extension, each said extension being moveable between a retracted position spaced from said screw receiving side of said hinge applicator to a screw delivery position adjacent and in communication with an aperture of said hinge applicator, when said hinge applicator is in the charging position at said screw and hinge receiving location.

14. Apparatus as in claim 11 and including a hinge applicator carriage moveable toward and away from said hinge leaf receiving surfaces and wherein said hinge applicator is mounted on said hinge applicator carriage for movement between said hinge applying location and said screw and hinge receiving location and for rotation between said charging position and said hinge applying position.

15. Apparatus as in claim 14 and including a screwdriver carriage mounted on said hinge applicator carriage for movement thereon toward and away from said hinge leaf receiving surfaces when said hinge applicator carriage is positioned with said hinge applicator located at said hinge applying location, whereby to move said screwdrivers between their said retracted position and said engaged position.

16. Apparatus as in claim 15 wherein said work members include a door and wherein said apparatus includes means for longitudinally positioning one end of said door on said work member supporting means at a register position, means for securing said door at said register position, a main carriage for carrying said hinge applicator carriage, means for supporting said main carriage for movement along a path parallel to said longitudinal edge of said door when the hinge applicator has been moved away from said hinge applying location, power means for automatically moving said main carriage in said path with means for automatically stopping and locking said main carriage at one or more positions for hinge locations at pre-determined distances from said registration position and automatic means to disengage said main carriage from a locked position and cause said carriage to resume movement along said carriage path.

17. Apparatus as in claim 16 and including means for locking said hinge applicator carriage to said door supporting means when said hinge applicator is at the hinge applying location.

18. Apparatus for hingedly connecting an adjacent pair of work members each having elongate hinge leaf receiving surfaces, by butt hinges to be seated on said receiving surfaces comprising:
   (a) means for supporting said work members so that said receiving surfaces are in position for receiving the leaves of said butt hinge,
   (b) a hinge applicator mounted for movement between a hinge applying location adjacent to said hinge leaf receiving surfaces when said work members are in position for receiving hinges and a hinge receiving location and having means for moving said applicator therebetween, said applicator having
      i. a screw receiving side and a hinge applying side with a plurality of apertures extending therebetween, said apertures being adapted for receiving screws at said screw receiving side and for guiding screws therethrough as they are screwed into said hinge leaf receiving surfaces and
      ii. hinge supporting means associated with said hinge applying side for releasably supporting a hinge positioned with the screw holes of each leaf in alignment with said apertures until the hinge leaves are screwed to said butt-receiving surfaces,
   (c) means for supplying screws individually to said apertures of said hinge applicator,
   (d) means for supplying to and placing individual hinges on said hinge applying side of said hinge applicator with their leaves unfolded and with the screw holes in register with said aperture when said hinge applicator is at the hinge receiving location and
   (e) a screwdriver unit comprising screwdrivers mounted for movement between a retracted position with the screwdrivers retracted from said hinge applicator and an engaged position with said screwdrivers engaged in said apertures of the hinge applicator for driving screws therethrough into said hinge leaf receiving surfaces when said hinge applicator is at the hinge applying location and separate power means associated with each of said screwdrivers for operation thereof independently of the operation of the other screwdrivers, said screwdriver unit having means associated therewith for moving the screwdriver unit between said retracted position and said engaged position.

* * * * *